2,806,822

POLYESTER-AMIDE COPOLYMERS

John B. Ott, Dayton, Ohio, assignor to Monsanto Chemical Company, St. Louis, Mo., a corporation of Delaware No Drawing. Application August 28, 1951,
Serial No. 244,099

12 Claims. (Cl. 260—2.5)

This invention relates to copolymers and more particularly to copolymers of aromatic compounds having a side chain containing ethylenic unsaturation with specific types of polyester-amides.

Copolymers of unsaturated polyesters with aromatic compounds having a side chain containing ethylenic unsaturation have been known for some time. They are generally quite hard and somewhat brittle when fully cured. For many purposes, such copolymers are ideal but for other applications, it is desirable to prepare a relatively soft and tough cured copolymer.

One object of this invention is to provide relatively soft tough copolymers of unsaturated polyesters and aromatic compounds having a side chain containing ethylenic unsaturation.

A further object is to provide copolymers of aromatic compounds having a side chain containing ethylenic unsaturation with unsaturated polyesters which have been modified with alkanol amines.

These and other objects are attained by reacting an alkanol amine with a saturated dicarboxylic acid which does not readily form an inner anhydride, reacting the product with an ethylenically unsaturated dicarboxylic acid or an anhydride thereof and then copolymerizing the product with an aromatic compound having a side chain containing ethylenic unsaturation.

The following examples are given in illustration and are not intended as limitations on the scope of this invention. Where parts are mentioned they are parts by weight.

Example I

An unsaturated polyester amide resin was prepared by condensing 1 mol of adipic acid with 1.1 mols of ethanolamine at about 175° C. for about 3 hours, raising the temperature to from 180–190° C., continuing the reaction at that temperature for about 2 hours, lowering the temperature to 135° C. and then adding 0.2 mol of maleic anhydride followed by a half-hour reaction period at 135° C. To the reaction product, 0.2 mol of vinyl benzoate was added along with 1% by weight of di-(tertiary butyl) peroxide. The mixture was then heated at 120° C. for about 16 hours to obtain a tough, flexible and extensible resin.

Example II

Example I was repeated except that 0.34 mol of styrene was substituted for the 0.2 mol of vinyl benzoate and 3% of lauroyl peroxide was used as the catalyst. The product was an insoluble, foamed resin slightly harder than the resin produced in Example I.

Example III

An unsaturated polyester-amide resin was prepared from adipic acid, N-phenyl ethanol amine, and fumaric acid. One mol of adipic acid was reacted with 1.2 mols of N-phenyl ethanolamine at 180–240° C. until the acid number of the product was about 6.5. Then 0.2 mol of fumaric acid was added and the reaction was continued at 195–231° C. to an acid number of about 29. The product was a viscous resinous material. To this viscous resin, were added 0.2 mol of styrene, 1% by weight of lauroyl peroxide and 1% by weight of 2-furoyl azide. The mixture was heated at 120° C. for about 45 minutes to produce a tough, soft, medium density, foamed resin which was insoluble in organic solvents and infusible.

The adipic acid of the examples may be substituted in whole or in part by other saturated dicarboxylic acids which do not form an inner anhydride such as azelaic, sebacic, terephthalic, hexahydroterephthalic, pimelic, brassylic, etc., acids. These acids may contain alkyl substituents having from 1 to 5 carbon atoms. The properties of the final product are partially dependent on the structure of the acid used so that, although the acids are broadly equivalent in that they may be used in the process of this invention to obtain resinous products, the products may vary over a wide range of elasticity and toughness.

The alkanolamines used to prepare the copolymers are limited to monoalkanol amines which may have one saturated or benzenoid organic substituent on the nitrogen atom. Among the alkanol amines which may be used are ethanolamine, propanolamine, butanolamine, iso-butanolamine, 2-amino-3-hexanol, 3-amino-4-heptanol, 2-amino-4-pentanol, 5-amino-4-octanol, 3-amino-3-methyl-2-butanol, 2-amino-2-methyl-3-hexanol, 2-amino-2-methyl-1-butanol, 3-amino-3-methyl-2-butanol, 3-amino-3-methyl-4-heptanol, 3-amino-2-methyl-4-heptanol, N-phenyl ethanolamine, N-ethyl ethanolamine, etc. The di and tri alkanol amines cause premature gelation of the polyester-amide so that it is impractical to form copolymers from polyester-amides made therewith.

The molar ratio of saturated dicarboxylic acid to alkanol amine may vary between 1:1.02 and 1:1.2. The reaction is carried out by heating the two components at 150–250° C. until the acid number of the condensation product ranges from 5 to 15. Under some conditions it is possible to reduce the acid number until it approaches zero. However, such materials generally gel before they can be further reacted. At an acid number of 5–15, gelation ceases to be a hazard and the products are especially reactive in the second stage of the invention.

The second stage comprises reacting the product of the first stage with an ethylenically unsaturated dicarboxylic acid or an anhydride thereof at temperatures of 125–250° C. The duration of this second reaction depends on the unsaturated dicarboxylic acid or anhydride used. For example, the reaction with maleic or chloromaleic anhydride is quite rapid and may be completed in a matter of minutes. On the other hand, fumaric or mesaconic acids which do not easily form anhydrides react more slowly so that completion of the reaction is not attained in less than an hour.

Among the ethylenically unsaturated dicarboxylic acids which may be used are maleic, fumaric, citraconic, mesaconic, itaconic, glutaconic, etc. acids, their anhydrides if they form anhydrides, and their halogen or alkyl derivatives such as chloromaleic, chlorofumaric, ethyl maleic, ethyl fumaric, etc. acids. The amount of ethylenically unsaturated dicarboxylic acids on a molar basis should be about twice the molar excess of alkanol amine over the saturated dicarboxylic acid, i. e., 0.04 to 0.4 mol of ethylenically unsaturated dicarboxylic acid per mol of saturated dicarboxylic acid.

The products of the second reaction are unsaturated polyester-amides which are compatible with monomeric aromatic compounds having a side chain containing ethylenic unsaturation. In many cases, the monomer is a good solvent for the polyamide. In others, from 1 to 30 parts of the monomer are compatible with 100 parts of the polyester-amide.

The monomeric materials copolymerize with the unsaturated polyester-amides in the presence of peroxidic catalysts to yield tough, elastic, insoluble, infusible resins. Among the monomers which may be used are styrene, nuclearly substituted styrenes, side-chain substituted styrenes, vinyl biphenyl, vinyl benzoate, vinyl naphthalene, etc. The amount of copolymerizable material may vary from about 0.75 to about 1.5 mol per mol of unsaturated acid added in step two or from 0.03 to 0.6 mol per mol of saturated dicarboxylic acid. The type and structure of the copolymerizable compound affects the properties of the resinous product. As shown in the examples, styrene produces a harder product than vinyl benzoate. Nuclearly substituted styrenes in which the substituents are alkyl groups produce resins which are intermediate in hardness.

The mixtures of the polyester-amide resins and the unsaturated aromatic compounds are relatively fluid before the copolymerization step so that the liquids may be used as impregnants or coatings and then copolymerized in situ. They may also be used as potting compounds and to prepare ornamental or decorative castings.

It is also possible to prepare soft but tough foam resins which are insoluble and infusible by incorporating a foaming agent such as furoyl azide, cinnamoyl azide, diazo aminobenzene, diazo diisopropyl dinitrile, etc. in the mixture of the polyester-amide resin with the unsaturated aromatic compound as shown in Example III. These foams are quite resistant to deterioration on aging and are not oxidized by long standing in air.

It is obvious that variations may be made in the products and processes of this invention without departing from the spirit and scope thereof as defined in the appended claims.

What is claimed is:

1. A copolymer of from 1 to 30 parts of an aromatic compound having a side-chain containing ethylenic unsaturation and 100 parts of an unsaturated polyester amide prepared solely from 1 mol of a saturated dicarboxylic acid which does not form an inner anhydride, from 1.02 to 1.2 mols of a non-tertiary mono-alkanolamine, and from 0.04 to 0.4 mol of a compound taken from the group consisting of ethylenically unsaturated dicarboxylic acids and the anhydrides thereof, said aromatic compound being taken from the group consisting of styrene, vinyl biphenyl, vinyl benzoate, and vinyl naphthalene.

2. A copolymer as in claim 1 wherein the aromatic compound is vinyl benzoate.

3. A copolymer as in claim 1 wherein the aromatic compound is styrene.

4. A copolymer as in claim 1 wherein the saturated dicarboxylic acid is adipic acid.

5. A copolymer as in claim 1 wherein the alkanol amine is ethanol amine.

6. A copolymer as in claim 1 wherein the alkanolamine is N-phenyl ethanolamine.

7. A copolymer as in claim 1 wherein the unsaturated dicarboxylic acid is maleic anhydride.

8. A copolymer as in claim 1 wherein the unsaturated dicarboxylic acid is fumaric acid.

9. A copolymer of from 1–30 parts of vinyl benzoate and 100 parts of a polyester-amide prepared solely from 1 mol of adipic acid, from 1.02 to 1.2 mols of ethanolamine, and 0.04 to 0.4 mol of maleic anhydride.

10. A copolymer of from 1–30 parts of styrene and 100 parts of a polyester-amide prepared solely from 1 mol of adipic acid, from 1.02 to 1.2 mols of N-phenyl ethanolamine, and 0.04 to 0.4 mol of fumaric acid.

11. An insoluble-infusible foamed resin comprising a copolymer of 100 parts of an unsaturated polyester-amide and from 1 to 30 parts of an aromatic compound having a side-chain containing ethylenic unsaturation, said foam having been formed by the decomposition of a foaming agent during the copolymerization reaction, said unsaturated polyester-amide having been prepared solely from 1 mol of a saturated dicarboxylic acid which does not form an inner anhydride, 1.02 to 1.2 mols of a non-tertiary monoalkanolamine and 0.04 to 0.4 mol of an ethylenically unsaturated dicarboxylic acid, said aromatic compound being taken from the group consisting of styrene, vinyl biphenyl, vinyl benzoate, and vinyl naphthalene.

12. A foamed resin as in claim 11 wherein the foaming agent is 2-furoyl azide.

References Cited in the file of this patent
UNITED STATES PATENTS

| | | |
|---|---|---|
| 2,255,313 | Ellis | Sept. 9, 1941 |
| 2,490,001 | Jayne et al. | Nov. 29, 1949 |
| 2,523,999 | Sattler et al. | Sept. 26, 1950 |
| 2,529,512 | Ott | Nov. 14, 1950 |